US008678468B2

(12) United States Patent
Huelke et al.

(10) Patent No.: US 8,678,468 B2
(45) Date of Patent: Mar. 25, 2014

(54) VEHICLE VISOR ASSEMBLY WITH A CENTER CHECK CLIP

(75) Inventors: David Huelke, Milan, MI (US); Phil Joseph Linson, Commerce Township, MI (US); James Allen Stec, Brownstown, MI (US); Justin Lee Healy, Canton, MI (US); John Andrew Stakoe, Bloomfield Hills, MI (US); Alexander V. Deych, Farmington Hills, MI (US); Jeff Todd Baxter, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/551,445

(22) Filed: Jul. 17, 2012

(65) Prior Publication Data

US 2014/0021735 A1 Jan. 23, 2014

(51) Int. Cl.
*B60J 3/02* (2006.01)
(52) U.S. Cl.
USPC ............................ 296/97.5; 296/97.9; 40/643
(58) Field of Classification Search
USPC ................ 296/97.1, 97.5, 97.9, 97.12, 97.13; 248/230.7; 40/643, 644, 593
See application file for complete search history.

(56) References Cited

U.S. PATENT DOCUMENTS

| 4,346,866 | A | * | 8/1982 | O'Hara | 248/316.5 |
| 5,238,163 | A | * | 8/1993 | Leach et al. | 224/312 |
| 5,316,362 | A | * | 5/1994 | McGuinness | 296/97.9 |
| 5,507,545 | A | * | 4/1996 | Krysiak | 296/97.9 |
| 5,538,311 | A | * | 7/1996 | Fusco et al. | 296/97.5 |
| 5,727,837 | A |   | 3/1998 | Viertel | |
| 5,947,545 | A | * | 9/1999 | Akagi et al. | 296/97.5 |
| 5,975,476 | A | * | 11/1999 | Mancinelli | 248/316.7 |
| 6,484,365 | B1 | * | 11/2002 | Thompson | 24/3.12 |
| 7,543,880 | B2 | * | 6/2009 | Wieczorek et al. | 296/97.9 |
| 7,686,373 | B1 |   | 3/2010 | McCabe et al. | |
| 2001/0007394 | A1 | * | 7/2001 | Beaver | 296/97.9 |
| 2002/0017800 | A1 | * | 2/2002 | Ichikawa et al. | 296/97.9 |
| 2004/0118885 | A1 | * | 6/2004 | Turner | 224/312 |
| 2007/0018476 | A1 | * | 1/2007 | Pallmer | 296/97.1 |
| 2008/0054670 | A1 | * | 3/2008 | Foster et al. | 296/97.9 |

FOREIGN PATENT DOCUMENTS

| JP | 2003165333 A | 6/2003 |
| JP | 2003205738 A | 7/2003 |
| JP | 2003237480 A | 8/2003 |

* cited by examiner

*Primary Examiner* — Jason S Morrow
(74) *Attorney, Agent, or Firm* — Vichit Chea; Price Heneveld LLP (57) ABSTRACT

A check assembly portion of a visor assembly for a vehicle is generally fixedly coupled with the headliner of the vehicle roof near a center portion of the vehicle, away from the vehicle door or windows. Adapting a clip to a check assembly portion of a visor assembly to secure small lightweight items will deter such items from being exposed to weather or wind conditions near a vehicle door, a vehicle sunroof, or an exposed top, which a visor portion of a visor assembly typically becomes closer to such locations. The visor portion may also be operable between a deployed and a non-deployed position, wherein the clip on the check assembly may be concealed in the non-deployed position.

14 Claims, 6 Drawing Sheets

VEHICLE VISOR ASSEMBLY WITH A CENTER CHECK CLIP

FIELD OF THE INVENTION

The present invention generally relates to visor assemblies for vehicles and, more specifically, visor assemblies that incorporate item holding devices.

BACKGROUND OF THE INVENTION

It is generally known to adapt a visor assembly to a portion of a vehicle frame above the vehicle's front windshield. Further, such visor assemblies are adapted to block light rays, such as UV rays or other vehicle headlight rays, from reflecting against a driver or passenger's field of vision.

SUMMARY OF THE INVENTION

According to one aspect of the present invention, a visor assembly for a vehicle includes an elongated support member that has a pivot end, an intermediate portion, and a securing end. The pivot end pivotally couples with a headliner of a vehicle. A visor is coupled with the elongated support member, such that the intermediate portion of the elongated support member extends within an edge portion of the visor. The visor is operable between a deployed and a non-deployed position. The visor assembly also includes check assembly that has a bracket coupled with the headliner of the vehicle. The bracket also has a clasp that removably engages the securing end of the elongated support member. A clip is disposed on the bracket, which is adapted to hold a small, lightweight item. The clip is concealed between the visor and the headliner when the visor is in the non-deployed position.

According to another aspect of the present invention the visor assembly for a vehicle includes an elongated support member that is pivotally coupled with the vehicle. The elongated support member has a pivot end and a securing end. The visor is coupled with the elongated support member and is operable between deployed and non-deployed positions. The check assembly includes a bracket that has a clasp, which is adapted for removably engaging the securing end. The check assembly also includes a clip disposed on the bracket. The clip is adapted to hold an informational item.

According to another aspect of the present invention, a visor assembly for a vehicle includes a visor, a support member, and a check assembly. The support member is pivotally coupled with the vehicle. The support member also extends through the visor to include a securing portion. The check assembly includes a bracket that has a clasp that removably couples with the securing portion. The check assembly also includes a clip that is disposed on the bracket to hold an informational item.

According to yet another aspect of the present invention, a check assembly portion of a visor assembly for a vehicle is fixedly coupled with a headliner of a roof of the vehicle near a center portion of the vehicle, away from the vehicle's doors or windows. A visor portion of the visor assembly is operable between a deployed and a non-deployed position, wherein a clip on the check assembly may be concealed in the non-deployed position. Adapting a clip to a check assembly portion of a visor assembly to secure small lightweight items will keep the items from being exposed to weather or air flow conditions near the doors, the windows, a vehicle sunroof, or an exposed top. However, the visor portion is frequently exposed to such weather or air flow conditions, especially when in the deployed position and when detached from the check assembly and pivoted to a side position along a top of the door.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
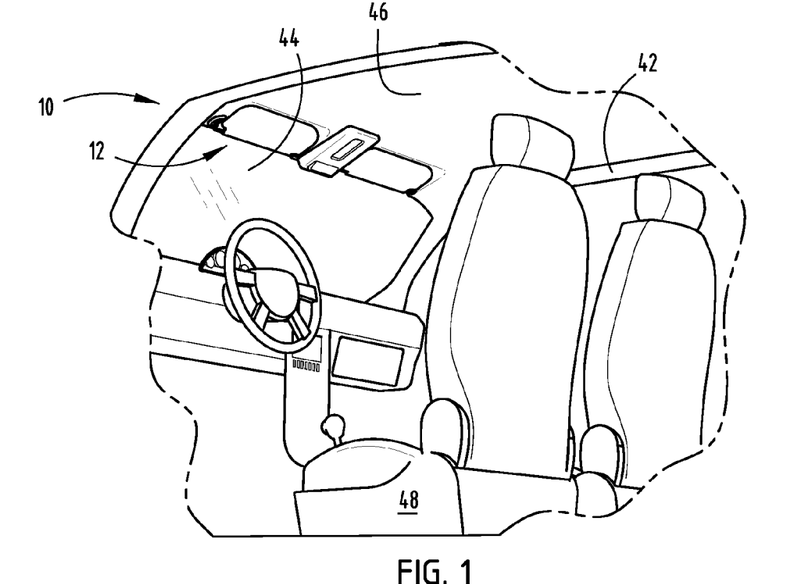
FIG. 1 is a side perspective view of a vehicle of the present invention with a door in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a vehicle having a visor assembly 12. The visor assembly 12 includes an elongated support member 14 that has a pivot end 16, an intermediate portion 18, and a securing end 20. The pivot end 16 pivotally couples with a headliner 22 of a vehicle 10. A visor 24 is coupled with the elongated support member 14, such that the intermediate portion 18 of the elongated support member 14 extends within an edge portion 26 of the visor 24. The visor 24 is operable between a deployed position 28 and a non-deployed position 30. The visor assembly 12 also includes check assembly 32 that has a bracket 34 coupled with the headliner 22 of the vehicle 10. The bracket 34 also has a clasp 36 that removably engages the securing end 20 of the elongated support member 14. A clip 38 is disposed on the bracket 34, which is adapted to hold a small, lightweight item 40. The clip 38 is concealed between the visor 24 and the headliner 22 when the visor 24 is in the non-deployed position 30.

As illustrated in FIG. 1, the visor assembly 12 is typically positioned on the headliner 22 of an interior frame 42 of the vehicle 10, which is located above a front windshield 44 along a front edge of a roof 46 of the vehicle 10. However, the visor assembly 12 is contemplated to be in other orientations and disposed at alternative positions within a vehicle. A user of the visor assembly 12 is typically seated in a front occupant seat 48 within the vehicle 10.

Figure 2:
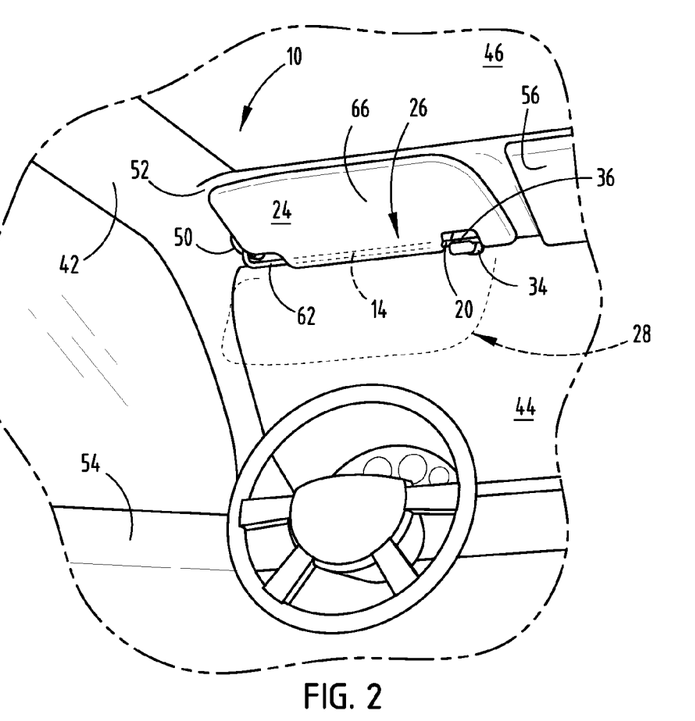
FIG. 2 is a front perspective view of a driver's side compartment showing a vehicle headliner and a visor assembly of the present invention in the non-deployed position.
Figure 3:
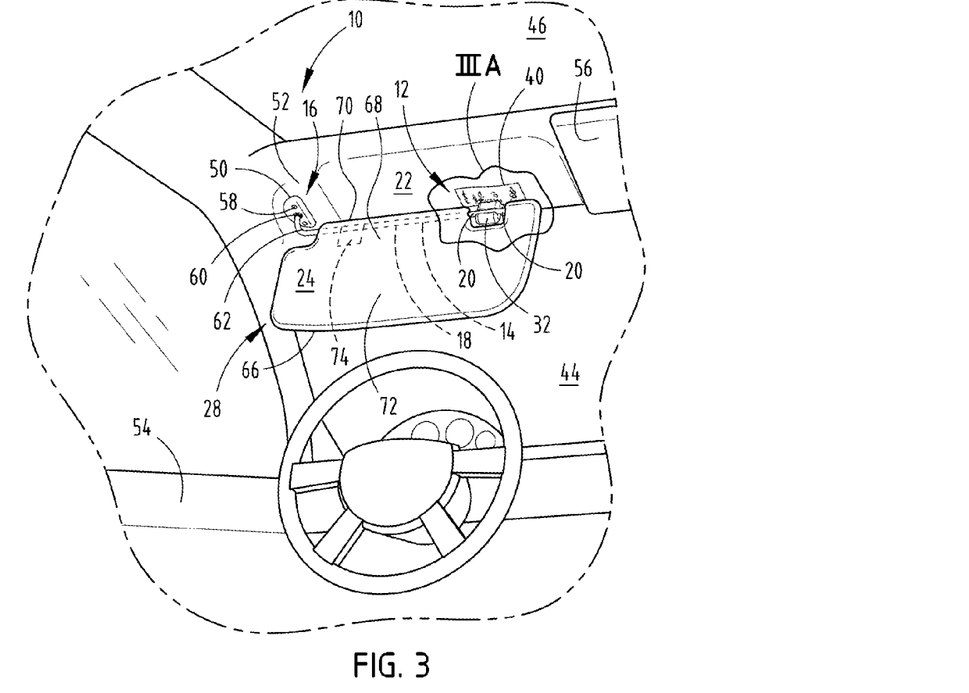
FIG. 3 is a front perspective view of a driver's side compartment showing a vehicle headliner and a visor assembly of the present invention in the deployed position.
Figure 3A:
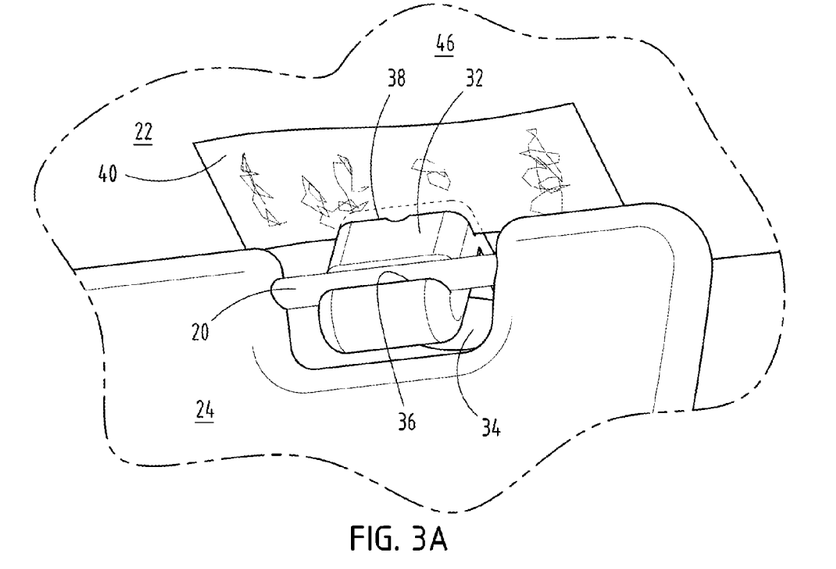
FIG. 3A is a front enlarged partial perspective view of the visor assembly of area IIIA of FIG. 3, marked as IIIA.
Figure 4:
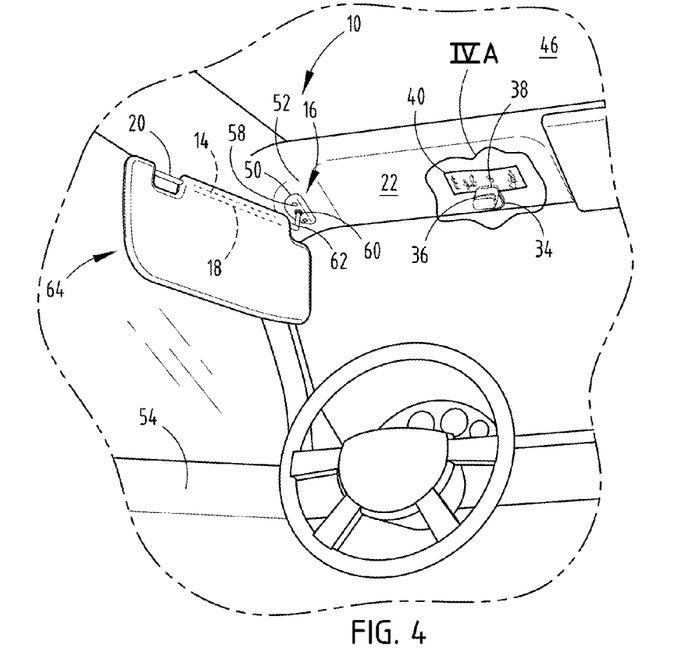
FIG. 4 is a front perspective view of a driver's side compartment showing a vehicle headliner and a visor assembly of the present invention in the deployed position and detached from the check assembly.
Figure 4A:
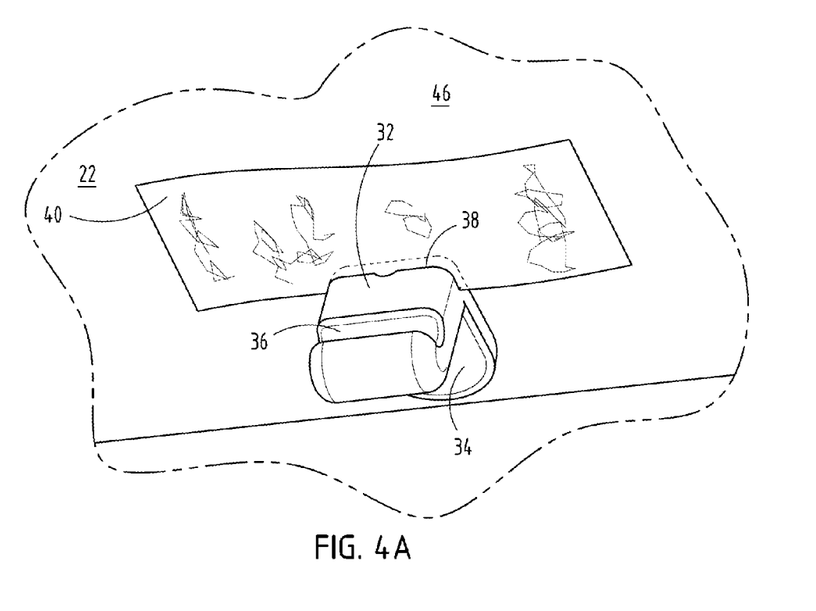
FIG. 4A is a front enlarged partial perspective view of the visor assembly of area IVA of FIG. 4.

Referring now to FIGS. 2-4A, the elongated support member 14 includes the pivot end 16, the intermediate portion 18, and the securing end 20. The pivot end 16 pivotally couples with the headliner 22 of the vehicle 10. More specifically, the pivot end 16 has a mounting bracket 50 that is fixedly coupled with an outside portion 52 of the headliner 22. The outside portion of the headliner 22 is defined by the portion of the headliner 22 near a side door 54, away from a general center 56 of the vehicle 10. The mounting bracket 50 is fixedly secured using at least one mounting fastener 58, such as a screw or bolt. The mounting bracket 50 has a socket 60 formed therein. The pivot end 16 of the elongated support member 14 includes a pivoting rod 62 that engages the socket 60 of the mounting bracket 50, allowing for pivotal movement therein. The socket 60 is adapted to allow for pivotal movement of the pivot rod 62, wherein the pivot rod 62 may be pivoted and frictionally held in various locations by the socket 60. For example, the pivot rod 62 may be moved to a side position 64, as illustrated in FIG. 4, wherein the visor assembly 12 is in the deployed position 28 and the visor 24 is detached from the check assembly 32. The pivot rod 62 is an integral piece of the elongated support member 14 and extends to the intermediate portion 18 thereof. However, it is contemplated that the pivot rod 62 is a separate piece, and further that the pivot end 16 pivotally couples with the headliner 22 in an alternate arrangement than that illustrated and described herein.

As shown in FIG. 3, the visor 24 of the visor assembly 12 is coupled with the elongated support member 14 about the intermediate portion 18 thereof. The visor 24 has a substantially flat rectangular shaped body 66, having a thickness between 1 mm-30 mm. The visor 24 also has an edge portion 68 defined by a long edge of the rectangular shaped body 66 nearest the headliner 22. The edge portion 68 has a cylindrical channel 70 formed therein for receiving the intermediate portion 18 of the elongated support member 14. The securing end 20 of the elongated support member 14 extends beyond the intermediate portion 18 of the elongated support member 14 and beyond the edge portion 68 of the visor 24. The securing end 20 is exposed and not engaged with the cylindrical channel 70 of the edge portion 68.

As show in FIGS. 2-4, the visor 24 is operable between deployed and non-deployed positions 28, 30. The visor 24 may be rotated about the intermediate portion 18 of the elongated support member 14 to transition between the deployed position 28 and the non-deployed position 30. In the non-deployed position 30, an upper surface 72 of the visor 24 is in abutting contact with the headliner 22. Alternatively, in the deployed position 28, the visor 24 is rotated down about the intermediate portion 18 of the elongated support member 14 exposing the upper surface 72 of the visor 24 to a user sitting in the front occupant seat 48 of the vehicle 10 (FIG. 1). In the deployed position 28, the visor 24 may be used for blocking light rays from the user's field of vision. A frictional or spring biased positioning device 74 is disposed within the rectangular shaped body 66 adjacent to the cylindrical channel 70 and engaging the elongated support member 14. The positioning device 74 allows the visor 24 to be pivoted at various angles about the intermediate portion 18 of the elongated support member 14 and stabilize the visor 24 in such positions, including the non-deployed and deployed positions 28, 30.

Figure 5:
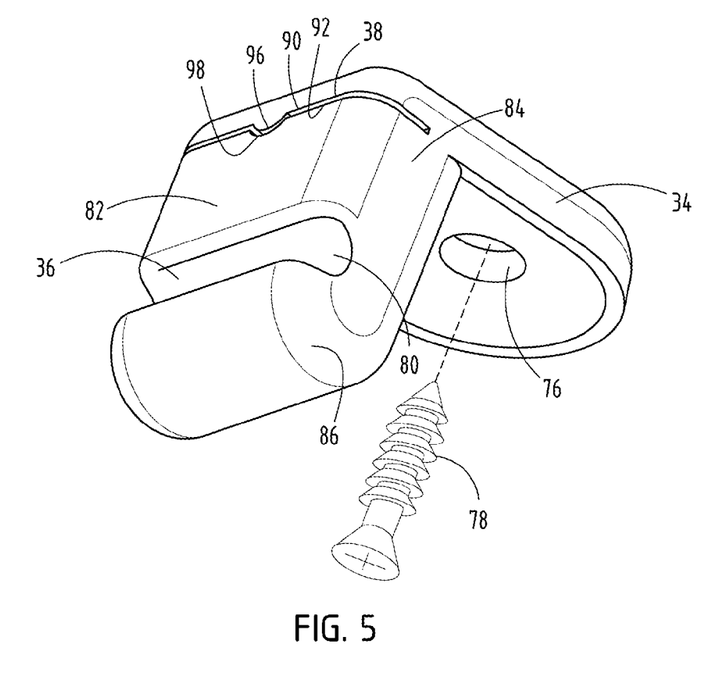
FIG. 5 is an exploded side perspective view of a check assembly of the present invention.

Referring now to FIG. 5, the visor assembly 12 includes the check assembly 32 that has the bracket 34 and the clip 38. The bracket 34 is coupled with the headliner 22 of the vehicle 10. (FIG. 4) The bracket 34 has an aperture 76 for receiving a fastener 78, such as a screw or a bolt. The fastener 78 couples with and extends through the aperture 76 into the headliner 22 of the vehicle 10 to fixedly secure the check assembly 32 thereto. The check assembly 32 is secured to the general center 56 of the headliner 22, away from the outside portion 52 of the headliner 22, at a distance from the pivot end of the elongated support member 14 generally equal to a length of the intermediate portion 18 of the elongated support member 14 (FIG. 4). It is also conceived that the bracket 34 can be secured to the general center 56 of the headliner 22 by more than one fastener 78 or by other fastening mechanisms, such as forming the check assembly 32 with the headliner 22 or using an adhesive.

Figure 6:
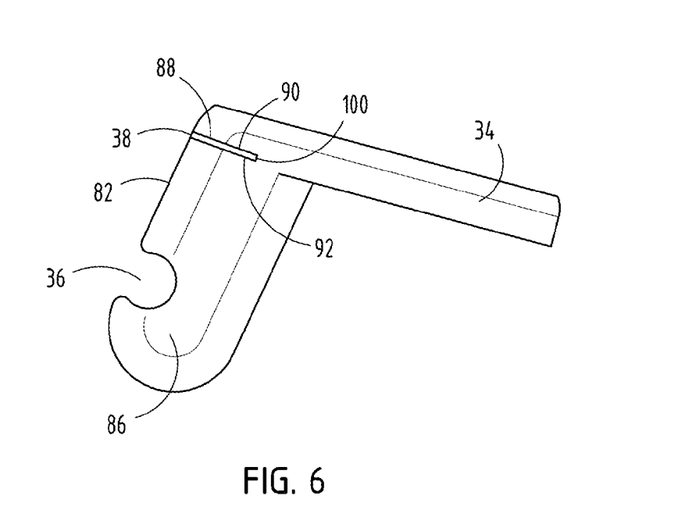
FIG. 6 is a side elevational view of a check assembly of the present invention.

Still referring to FIG. 5, the bracket 34 also has a clasp 36 for removably engaging the securing end 20 of the elongated support member 14. The clasp 36 includes an arcuate groove 80 extending in parallel alignment with the headliner 22 of the vehicle 10 (FIG. 4A) along an upper facing surface 82 of a bracket member 84. The bracket member 84 extends orthogonally from the bracket 34 and the headliner 22 of the vehicle 10 (FIG. 4) to a rounded end 86 beyond the clasp 36. As best illustrated in FIG. 6, the arcuate groove 80 of the clasp 36 has a substantially semi-circle shaped cross-section formed to engage with a cylindrical shaped elongated support member 14. Upon engaging the securing end 20 of the elongated support member 14 with the clasp 36, the rounded end 86 of the bracket member 84 extending beyond the clasp 36 temporarily flexes away from the vehicle roof 46, thereby expanding the opening of the arcuate groove 80 to allow the diameter of the elongated support member 14 to enter and frictionally engage with the arcuate groove 80. The securing end 20 of the elongated support member 14 may disengage from the clasp 36 and the visor 24 may be pivoted about the pivot end 16 towards the side door 54, easily manipulated by the user, without the use of tools.

As shown in FIGS. 5-6, a clip 38 is disposed on the bracket 34 to hold the small lightweight item 40 or items. As illustrated in FIG. 6, the clip 38 comprises a slot 88 having a first side wall 90 and a second side wall 92 that define a thickness therebetween. The slot 88 is formed along the upper facing surface 82 of the bracket member 84 in substantially parallel alignment with the arcuate groove 80 of the clasp 36, between the clasp 36 and the headliner 22. A protrusion 96 extends from the first side wall 90 toward the second side wall 92, wherein the protrusion 96 is adapted to generally secure the small lightweight item 40. The protrusion 96 has an outwardly curved arcuate surface facing the second side wall 92, and accordingly, the second side wall 92 has an indentation 98 with a recessed surface substantially aligned with the curved arcuate surface of the protrusion 96. The distance between the protrusion 96 and the indentation 98 is generally equal to the thickness of the slot 88, however, it is also conceived that such distance can vary from the thickness of the slot 88 to provide additional support in holding the small lightweight item 40. Additionally, it is conceived that the thickness of the slot 88 may narrow from the upper facing surface 94 of the bracket member 84 to a bottom 100 of the slot 88, allowing the small lightweight item 40 to easily wedge between the first and second side wall 90, 92. It is also conceived that the slot 88 may have more than one protrusion 96 extending from the first or second side wall 90, 92 toward the opposing side wall.

Figure 7:
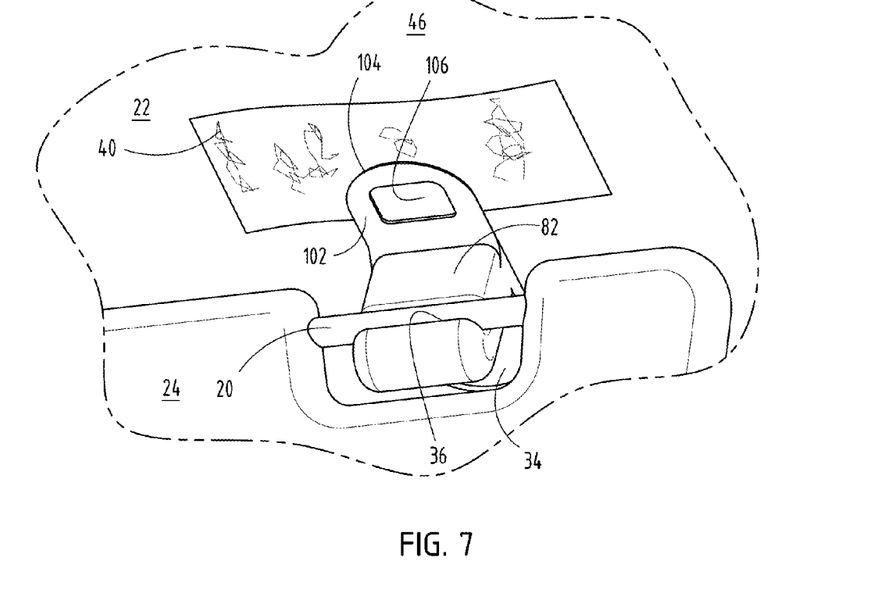
FIG. 7 is an enlarged front perspective view of another embodiment of a check assembly of the present invention in the deployed position.
Figure 7A:
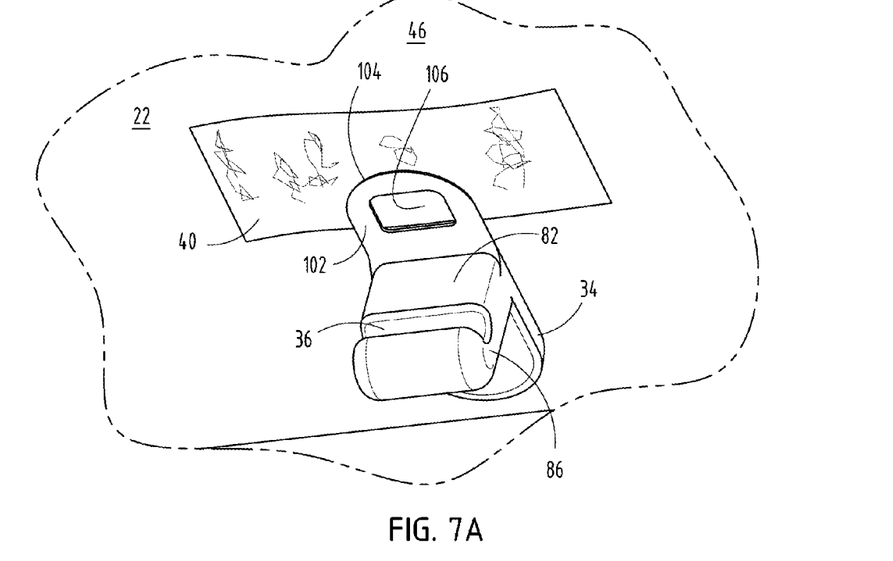
FIG. 7A is an enlarged front perspective view of the embodiment of FIG. 7 in the deployed position and detached from the check assembly.
Figure 8:
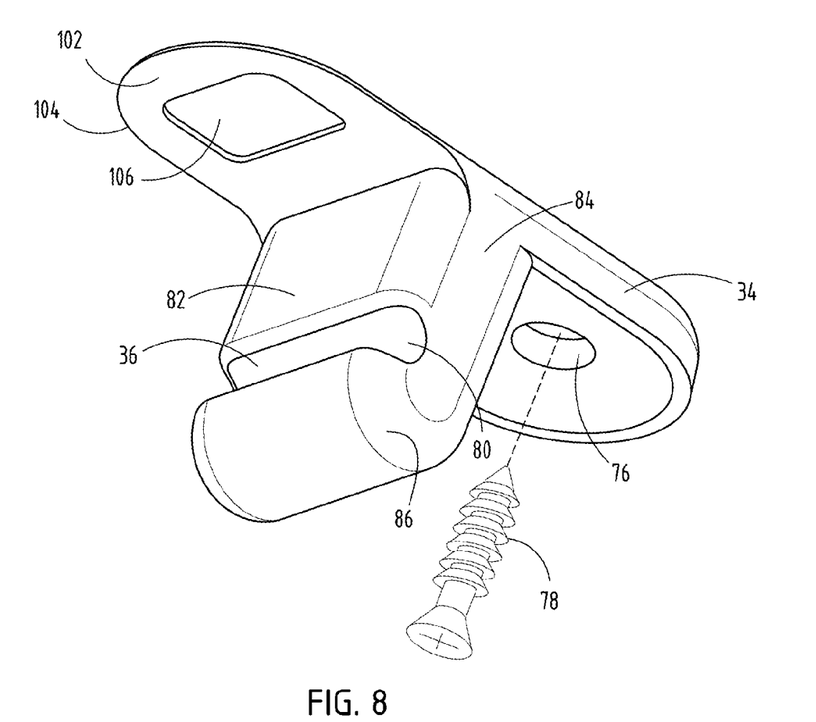
FIG. 8 is a side perspective view of the embodiment of FIG. 7.
Figure 9:
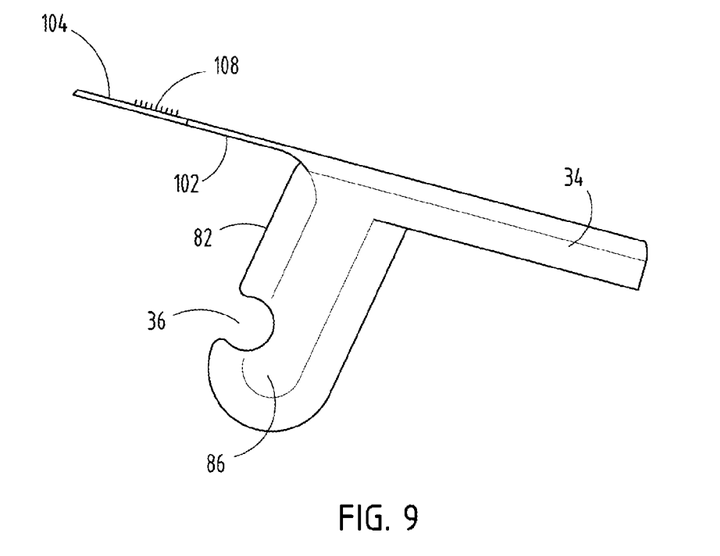
FIG. 9 is a side elevational view of the embodiment of FIG. 7.

Referring now to FIGS. 7-9, an alternative embodiment of the clip 38 on the check assembly 32 is illustrated. In such an alternative embodiment, the clip 38 comprises a tab 102 extending from the bracket 34 in general planar alignment with the headliner 22. The tab 102 includes a contact surface 104 that abuts the headliner 22 of the roof 46 and is adapted to secure the small lightweight item 40 between the contact surface 104 and the headliner 22. The tab 102 is flexibly removable from abutting contact with the headliner 22, retaining the flexed tension when the small lightweight item 40 is placed between the contact surface 104 and the headliner 22 and elastically releasing the flexed tension when the tab 102 returns to abutting contact with the headliner 22. The tab 102 has an opening 106 formed in a central portion of the tab 102, which allows a user to access and manipulate the small lightweight item 40 disposed between the contact surface 104 and the headliner 22. Further, the contact surface 104 of the tab 102 has a rough portion 108 that provides additional frictional support to the small lightweight item 40 that is disposed between the contact surface 104 and the headliner 22. An alternative embodiment of the clip 38, such as a spring-biased clip, a binder style clip, or another alternative embodiment of a clip 38 that is adapted to removably engage the small lightweight item 40 may be incorporated with the check assembly 32.

The components of the check assembly 32, including the bracket 34, the clasp 36, and the clip 38, are integrally formed as one single piece. However, the components may be integrally formed as single pieces or multiple integral pieces. The check assembly 32 and its individual components are made of a polymer material that provides the flexible capabilities outlined and described herein. The small lightweight item 40 that is received by the clip 38 may include a ticket, an informational item, a paper note, a plastic card, a brochure, a pamphlet, a piece of currency, a writing utensil, a pair of sunglasses, and other small lightweight items. Alternate embodiments of the clip 38 may utilized that are configured for securing a specific type of small lightweight item 40.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:
1. A visor assembly for a vehicle, comprising:
a visor having a securing portion;
a support member pivotally coupled with a roof of the vehicle and supporting the visor;
a check assembly, comprising:
a bracket coupled with the roof and having a clasp protruding downward with a groove facing rearward for removably engaging the securing portion; and
a uniform slot facing rearward and disposed laterally across and into the bracket for holding an informational item.

2. The visor assembly of claim 1, wherein the clasp and the bracket are a single integral piece, and wherein the uniform slot and the groove are in parallel alignment on the bracket.

3. The visor assembly of claim 1, wherein the slot has a first and second side wall defining a consistent thickness therebetween and at least one protrusion protruding from the first side wall and extending along a depth of the slot, wherein the at least one protrusion is adapted to generally secure an informational item.

4. The visor assembly of claim 3, wherein the at least one protrusion has an arcuate surface and the slot includes an indentation having a recessed surface substantially aligned with the arcuate surface and formed in the second side wall opposite the at least one protrusion.

5. A visor assembly for a vehicle, comprising:
a visor having a securing portion;

a support member pivotally coupled with a headliner of the vehicle and rotatably supporting the visor;
a check assembly, comprising:
   a bracket coupled with the headliner and having a clasp protruding downward with a groove for removably engaging the securing portion; and
   a uniform slot disposed laterally across the bracket between the clasp and the headliner for holding an informational item.

6. The visor assembly of claim 5, wherein the clasp and the bracket are a single integral piece.

7. The visor assembly of claim 5, wherein at least one protrusion extends from a first side of the uniform slot for frictionally securing the informational item between the at least one protrusion and a second side of the uniform slot opposite the first side.

8. The visor assembly of claim 5, wherein the uniform slot has a first and second side defining a consistent thickness therebetween.

9. A check assembly for a vehicle visor, comprising:
   a bracket having a first end coupled with a vehicle roof;
   a clasp protruding orthogonally from a second end of the bracket and having a groove facing rearward for removably coupling the vehicle visor; and
   a uniform disposed across the second end in parallel alignment with the groove and having a protrusion extending into the slot for frictionally supporting an informational item.

10. The visor assembly of claim 9, wherein the clasp and the bracket are a single integral piece.

11. The visor assembly of claim 9, wherein a fastener extends through the first end of the bracket to couple with a central portion of the vehicle roof.

12. The visor assembly of claim 9, wherein the uniform slot and the groove are in parallel alignment and face rearward from the second end of the bracket.

13. The visor assembly of claim 12, wherein the uniform slot has a protrusion extending from a first side of the uniform slot that is adapted to generally secure an informational item.

14. The visor assembly of claim 13, wherein the protrusion extends into the slot along the first side, and wherein the uniform slot has a consistent thickness between the first and second sides defining a recessed indentation on the second side aligned with the protrusion.

* * * * *

UNITED STATES PATENT AND TRADEMARK OFFICE
CERTIFICATE OF CORRECTION

| | | |
|---|---|---|
| PATENT NO. | : 8,678,468 B2 | Page 1 of 1 |
| APPLICATION NO. | : 13/551445 | |
| DATED | : March 25, 2014 | |
| INVENTOR(S) | : Huelke et al. | |

It is certified that error appears in the above-identified patent and that said Letters Patent is hereby corrected as shown below:

In the Claims

Column 8
Claim 9, line 1, before "disposed" insert --slot--.

Signed and Sealed this
Fifteenth Day of July, 2014

Michelle K. Lee
*Deputy Director of the United States Patent and Trademark Office*